United States Patent
Ishikawa et al.

(10) Patent No.: US 9,653,764 B2
(45) Date of Patent: May 16, 2017

(54) METHOD AND APPARATUS FOR RECOVERING SODIUM FROM SODIUM-SULFUR BATTERY

(71) Applicant: MITSUBISHI MATERIALS CORPORATION, Tokyo (JP)

(72) Inventors: Shigeru Ishikawa, Iwaki (JP); Makoto Takagi, Kagawa-gun (JP); Eiji Wajima, Kagawa-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 14/914,893

(22) PCT Filed: Oct. 1, 2014

(86) PCT No.: PCT/JP2014/076304
§ 371 (c)(1),
(2) Date: Feb. 26, 2016

(87) PCT Pub. No.: WO2015/186269
PCT Pub. Date: Dec. 10, 2015

(65) Prior Publication Data
US 2016/0218403 A1 Jul. 28, 2016

(30) Foreign Application Priority Data
Jun. 3, 2014 (JP) .................... 2014-115001

(51) Int. Cl.
*H01M 10/00* (2006.01)
*H01M 10/54* (2006.01)
(Continued)

(52) U.S. Cl.
CPC ............... *H01M 10/54* (2013.01); *C22B 3/04* (2013.01); *C22B 7/006* (2013.01); *C22B 7/008* (2013.01);
(Continued)

(58) Field of Classification Search
CPC .... H01M 10/3909; H01M 10/54; C01D 1/04; C01D 1/42; C22B 26/10; C22B 7/006
(Continued)

(56) References Cited

U.S. PATENT DOCUMENTS 5,015,541 A * 5/1991 Evans ..................... H01M 6/52
429/104
5,055,283 A * 10/1991 Bilger ................... H01M 10/54
423/189
(Continued)

FOREIGN PATENT DOCUMENTS

CN 101847567 A 9/2010
DE 4227511 C1 7/1993
(Continued)

OTHER PUBLICATIONS

International Search Report mailed Dec. 22, 2014, issued for PCT/JP2014/076304.
(Continued)

*Primary Examiner* — Steven Bos
(74) *Attorney, Agent, or Firm* — Locke Lord LLP (57) ABSTRACT

A method for recovering sodium from a sodium-sulfur battery of the present invention includes a reaction step of injecting a treatment liquid toward the sodium housed in a sodium-housing component in the battery container and causing the sodium to react with the treatment liquid so as to generate a reaction liquid; and a circulation step of generating the treatment liquid by adjusting the concentration and liquid temperature of the reaction liquid, and, in the reaction step, while the entire amount of the sodium is reacted with the treatment liquid, the treatment liquid is continuously injected toward the sodium.

16 Claims, 6 Drawing Sheets

(51) Int. Cl.
*C22B 3/04* (2006.01)
*C22B 26/10* (2006.01)
*H01M 10/39* (2006.01)
*C22B 7/00* (2006.01)

(52) U.S. Cl.
CPC ......... *C22B 26/10* (2013.01); *H01M 10/3909* (2013.01); *Y02P 10/234* (2015.11); *Y02W 30/84* (2015.05)

(58) Field of Classification Search
USPC .................................. 423/183, 198; 429/49
See application file for complete search history.

(56) References Cited

U.S. PATENT DOCUMENTS

| | | | | |
|---|---|---|---|---|
| 5,120,616 A | * | 6/1992 | Bauer | ..................... C22B 7/005 |
| | | | | 429/104 |
| 5,508,018 A | * | 4/1996 | Brons | ....................... C01B 3/06 |
| | | | | 423/183 |
| 5,543,242 A | * | 8/1996 | Tsuchimoto | .......... H01M 10/54 |
| | | | | 266/207 |
| 5,785,732 A | | 7/1998 | Tsuchimoto et al. | |
| 6,109,156 A | | 8/2000 | Tsuchimoto et al. | |
| 2013/0288153 A1 | * | 10/2013 | Yang | ................... H01M 8/1004 |
| | | | | 429/482 |

FOREIGN PATENT DOCUMENTS

| | | |
|---|---|---|
| JP | 06-060915 A | 3/1994 |
| JP | 08-088029 A | 4/1996 |
| JP | 10-058395 A | 3/1998 |
| JP | 10-144362 A | 5/1998 |
| JP | 2000-015215 A | 1/2000 |
| JP | 2003-121593 A | 4/2003 |
| JP | 2006-073216 A | 3/2006 |
| JP | 2012-003979 A | 1/2012 |

OTHER PUBLICATIONS

The extended European search report dated Mar. 10, 2017 issued for corresponding European Patent Application No. 14893809.5.

* cited by examiner

METHOD AND APPARATUS FOR RECOVERING SODIUM FROM SODIUM-SULFUR BATTERY

TECHNICAL FIELD

The present invention relates to a method for recovering sodium from a sodium-sulfur battery and an apparatus for recovering sodium from a sodium-sulfur battery.

Priority is claimed on Japanese Patent Application No. 2014-115001, filed Jun. 3, 2014, the content of which is incorporated herein by reference.

BACKGROUND ART

In recent years, as a power storage system, a sodium-sulfur battery (hereinafter, referred to as a NaS battery), which is a secondary battery using a reaction between sodium and sulfur, has been under development.

Such a NaS battery has a structure in which, for example, a β-alumina solid electrolyte tube is charged in a positive electrode container made of aluminum or the like, sulfur is loaded into a space between the positive electrode container and the β-alumina solid electrolyte tube, and sodium is loaded into the β-alumina solid electrolyte tube.

In addition, a NaS battery has a constitution in which, for example, the ion conductivity of a β-alumina solid electrolyte is increased in a high-temperature environment of 300° C. or higher so as to cause sodium and sulfur to reversibly react with each other through the solid electrolyte, thereby repeating charging and discharging. Furthermore, the positive electrode container and the β-alumina solid electrolyte tube are, generally, housed in an exterior container made of stainless steel or the like for the convenient handling thereof.

Since the NaS battery deteriorates as charging and discharging are repeated, the NaS battery has a service life of approximately 10 years, and it is necessary to appropriately treat the NaS battery that has been used for the entire service life. Particularly, since metallic sodium generated in the charged NaS battery reacts with moisture and thus easily generates hydrogen, it is necessary to appropriately treat the NaS battery. Therefore, for example, Patent Documents 1 to 3 disclose a variety of techniques for treating NaS batteries that have been used for the entire service life.

For example, Patent Document 1 discloses a method in which the NaS battery is cut open at the mouth and is immersed in a heating oil tank, and molten sodium is caused to flow down from the inside and is recovered.

In addition, Patent Document 2 proposes a method in which a NaS battery that has been used for the entire service life is disassembled and molten sodium is removed into a paraffin tank and a NaS battery having a structure in which the NaS battery is easily disassembled.

Furthermore, Patent Document 3 proposes a method in which a NaS battery that has been used for the entire service life is cut open at an electrode cap, the positive electrode container or the solid electrolyte tube is broken, and the NaS battery is incinerated in excess air.

PRIOR ART DOCUMENTS

Patent Documents

Patent Document 1: Japanese Unexamined Patent Application, First Publication No. H08-088029
Patent Document 2: Japanese Unexamined Patent Application, First Publication No. H10-144362
Patent Document 3: Japanese Unexamined Patent Application, First Publication No. H06-060915

SUMMARY OF INVENTION

Technical Problem

In recent years, NaS batteries have been put into practical use, and a number of NaS batteries have become used. Since the service life of the NaS battery is approximately 10 years as described above, it is expected that, in the future, a number of NaS batteries will be disposed of. Therefore, there is a demand for the efficient disposal treatment of NaS batteries.

However, in the treatment methods described in Patent Documents 1 and 2, when metallic sodium comes into contact with oxygen, heat is generated due to an oxidation reaction, and thus it is necessary to remove molten sodium in a state in which the NaS battery is immersed in molten paraffin or the like, which makes the handling troublesome. As a result, there is a problem in that the disposal treatment of NaS batteries cannot be efficiently carried out.

In addition, in the treatment method described in Patent Document 3, since sodium and sulfur are reacted with each other and thus are removed at the same time by incinerating a NaS battery that has been used for the entire service life in excess air, unlike in the above-described methods, metallic sodium is not directly handled. However, since it is necessary to cut the NaS battery open at the electrode cap or break the positive electrode container and the solid electrolyte tube in order to cause sodium or sulfur to flow down outside, there is a concern that metallic sodium may leak outside the incineration furnace during the cutting or the breaking.

The present invention has been made in consideration of the above-described circumstances, and an object of the present invention is to provide a method for recovering sodium from a NaS battery and an apparatus for recovering sodium from a NaS battery in which a disposed NaS battery can be efficiently treated by combining an incineration treatment apparatus with the recovering apparatus.

Solution to Problem

In order to solve the above-described problem, according to an aspect of the method for recovering sodium from a sodium-sulfur battery of the present invention, a method is provided for recovering sodium from a sodium-sulfur battery housing sodium and sulfur in a battery container, the method including a reaction step of injecting a treatment liquid toward the sodium housed in a sodium-housing in the battery container, and causing the sodium to react with the treatment liquid so as to generate a reaction liquid; and a circulation step of adjusting the concentration and liquid temperature of the reaction liquid so as to generate the treatment liquid, in which, in the reaction step, while the entire amount of the sodium is reacted with the treatment liquid, the treatment liquid is continuously injected toward the sodium.

According to the aspect of the method for recovering sodium from a sodium-sulfur battery of the present invention, due to the reaction step of continuously injecting the treatment liquid toward sodium so as to cause the treatment liquid to react with sodium and recovering sodium in the form of a reaction liquid obtained from the reaction with the treatment liquid, a temperature increase caused by the reaction heat between sodium and a treatment liquid is suppressed, and it becomes possible to safely and efficiently recover sodium in a NaS battery.

In the aspect of the present invention, the treatment liquid may be an aqueous solution of sodium hydroxide.

When the aqueous solution of sodium hydroxide is used as the treatment liquid, it is possible to effectively control the reaction rate of sodium and to produce the treatment liquid at a low cost.

In the aspect of the present invention, when the concentration (wt %) is represented by x and the liquid temperature (° C.) is represented by y, the concentration and liquid temperature of the treatment liquid may be set so as to fall into a range surrounded by the following linear expressions, x=30, x=50, y=15, y=55, y=2x−20, and y=2x−70.

When the concentration and liquid temperature of the aqueous solution of sodium hydroxide are set so as to fall into the above-described range, the reaction rate of the treatment liquid with sodium becomes excessively fast so that an excessive increase in the temperature of sodium due to the reaction heat is prevented, and the impossibility of an efficient treatment due to the excessively slow reaction rate of the treatment liquid with sodium and the consequent long time necessary for recovering sodium from the NaS battery is prevented.

In the aspect of the present invention, the reaction of the sodium may be determined to have ceased when the liquid temperature of the treatment liquid and the liquid temperature of the reaction liquid become equal to each other, and the supply of the treatment liquid may be stopped.

According to an aspect of an apparatus for recovering sodium from a sodium-sulfur battery of the present invention, an apparatus is provided for recovering sodium from a sodium-sulfur battery used in the method for recovering sodium from a sodium-sulfur battery, the apparatus including a nozzle configured to inject the treatment liquid toward the sodium in the sodium-housing while being in a state where the nozzle is inserted to the sodium-housing, a treatment liquid supply configured to supply the treatment liquid to the nozzle, a reaction liquid-recovering configured to recover the reaction liquid obtained from a reaction between the treatment liquid and the sodium, and a circulation treatment configured to return the reaction liquid to the treatment liquid supply as the treatment liquid after adjusting the concentration and liquid temperature of the reaction liquid.

According to the aspect of the apparatus for recovering sodium from a sodium-sulfur battery of the present invention, when sodium is recovered from a NaS battery that has been used for the entire service life, it is possible to recover sodium in the form of a reaction liquid obtained from a reaction between the treatment liquid and the sodium by continuously injecting the treatment liquid toward the sodium from the nozzle so as to cause the treatment liquid to react with the sodium. With a structure capable of continuously injecting the treatment liquid, a temperature increase caused by the reaction heat between sodium and the treatment liquid is suppressed, and it becomes possible to safely and efficiently recover sodium in a NaS battery.

In the aspect of the present invention, the apparatus may be provided with a nozzle-moving device for vertically moving the nozzle so as to maintain a certain range of a gap between an exposed surface of the sodium and an injection of the nozzle.

Therefore, even when the location of the exposed surface of the sodium is lowered as the reaction proceeds, it is possible to prevent a large variation in the reaction rate between the sodium and the treatment liquid by reliably injecting the treatment liquid to the exposed surface of the sodium.

In the aspect of the present invention, the circulation treatment may include a water dispenser for decreasing the concentration of the reaction liquid and cooler for decreasing the temperature of the reaction liquid.

When the water dispenser is provided, the treatment liquid can be easily recycled simply by adding water so as to dilute the reaction liquid, and it becomes possible to reduce the treatment cost of sodium. In addition, when the cooler is provided, it is possible to adjust the treatment liquid obtained by recycling the reaction liquid which has generated heat in the reaction step to a temperature suitable for the reaction step.

In the aspect of the present invention, the apparatus may be provided with a first temperature detector configured to measure the liquid temperature of the treatment liquid, a second temperature detector configured to measure the liquid temperature of the reaction liquid, and a control unit configured to control the treatment liquid supply after comparing the liquid temperature of the treatment liquid and the liquid temperature of the reaction liquid and determining the occurrence of a reaction of the sodium in the sodium-housing.

Therefore, the occurrence of a reaction of the sodium in the sodium-housing is easily detected simply by comparing the liquid temperature of the treatment liquid and the liquid temperature of the reaction liquid, and it is possible to carry out the supply of the treatment liquid at an accurate timing.

In the aspect of the present invention, the apparatus may be provided with a chamber for housing the sodium-sulfur battery, an inert gas supply for supplying an inert gas into the chamber, and exhausting device for exhausting flammable gas from the chamber.

Therefore, even when, for example, flammable gas is generated due to the reaction between the treatment liquid and sodium, it is possible to safely discharge the flammable gas without causing the flammable gas to react with oxygen and the like in the air.

In the aspect of the present invention, when the liquid temperature of the treatment liquid and the liquid temperature of the reaction liquid become equal to each other, the control unit may determine that the reaction of the sodium has ceased and the reaction heat is not generated any longer and controls the treatment liquid supply to stop the supply of the treatment liquid to the nozzle.

Therefore, it is possible to reliably and easily detect that there is no remaining sodium by using the fact that, while the treatment liquid is reacted with the sodium, the liquid temperature of the reaction liquid is higher than the liquid temperature of the treatment liquid due to the reaction heat.

Advantageous Effects of Invention

According to the aspect of the apparatus for recovering sodium from a NaS battery of the present invention and the aspect of the method for recovering sodium from a NaS battery using the same apparatus, it becomes possible to efficiently and safely treat a disposed NaS battery.

DESCRIPTION OF EMBODIMENTS (NaS Battery)

First, in the first place, an example of the structure of a NaS battery to which the present invention is applied will be described.

Figure 1:
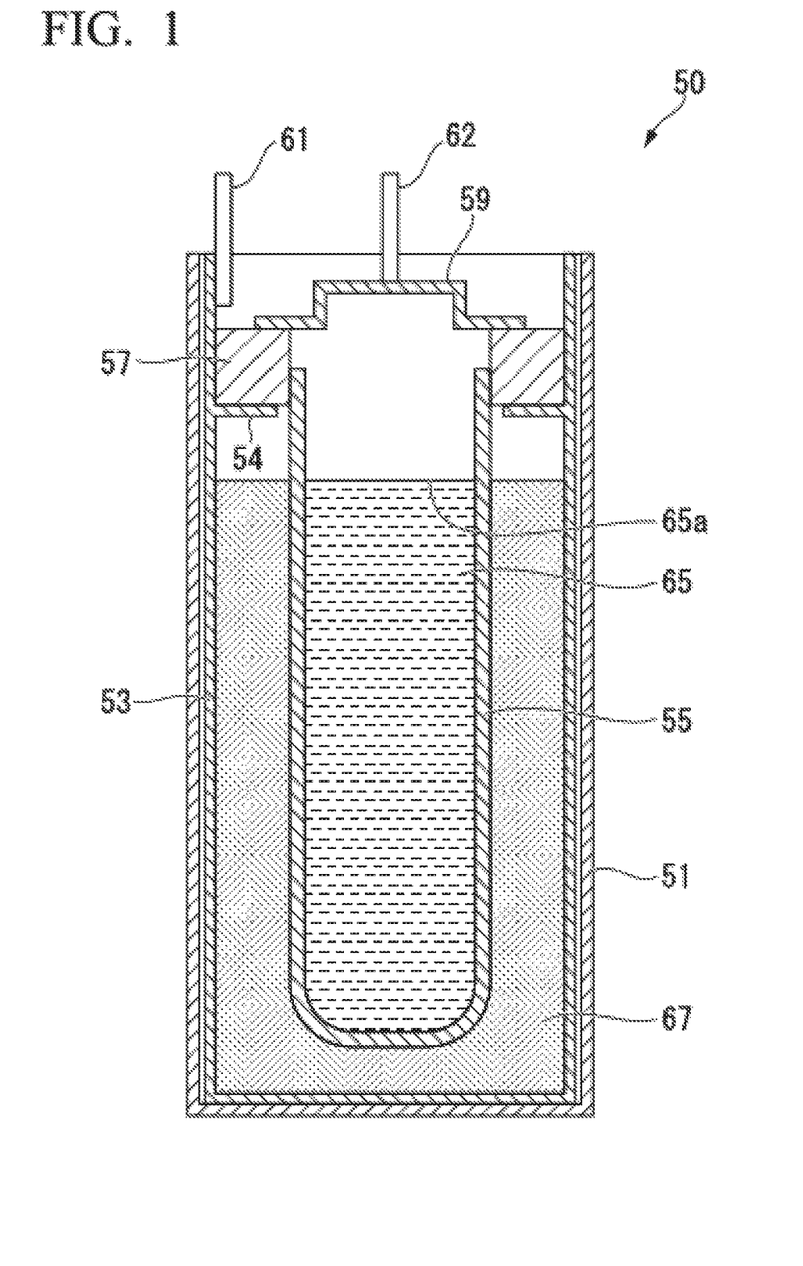
FIG. 1 is a sectional view illustrating an example of a NaS battery.

FIG. 1 is a sectional view illustrating an example of the NaS battery in a charged state.

A NaS battery 50 includes a positive electrode container 53 which is an airtight container, a solid electrolyte tube 55 housed in the positive electrode container 53, and an exterior container (battery container) 51 housing the positive electrode container 53 and the solid electrolyte tube 55. Here, the exterior container 51 (that is, the outer shape of the NaS battery) is formed in, for example, a cylindrical shape having a diameter of 90 mm and a length of 520 mm.

At the upper of the positive electrode container 53, a support 54 protruding inward in the radial direction is formed, and a circular insulating member 57 is disposed on the support 54. The circular insulating member 57 is fitted between the inner circumferential surface of the positive electrode container 53 and the outer circumferential surface of the solid electrolyte tube (sodium-housing) 55. An electrode cap 59 is provided on the circular insulating member 57.

That is, the present embodiment has a constitution in which the inside of the positive electrode container 53 is air-tightly closed by providing the electrode cap 59 at an opening of the positive electrode container 53.

In addition, in a state in which the NaS battery 50 is charged, a single body of metallic sodium (hereinafter, referred to as sodium) 65 is loaded into the inside of the solid electrolyte tube (sodium-housing) 55. In addition, in a space between the positive electrode container 53 and the solid electrolyte tube 55, a sulfur electrode 67 obtained by soaking graphite felt with sulfur is provided.

In addition, a positive electrode 61 is connected to the upper end of the positive electrode container 53, and a negative electrode terminal 62 is provided in the electrode cap 59.

The positive electrode container 53 is made of, for example, aluminum, and the exterior container (battery container) 51 is made of, for example, stainless steel containing nickel. In addition, the solid electrolyte tube (sodium-housing) 55 is made of β-alumina. Furthermore, the circular insulating member 57 is made of α-alumina, and the electrode cap 59 is made of aluminum or the like. Furthermore, the positive electrode terminal 61 and the negative electrode terminal 62 are made of, for example, aluminum.

The NaS battery 50 having the above-described constitution has a constitution in which sodium (Na) loaded in the inside of the solid electrolyte tube 55 and sulfur (S) disposed outside the solid electrolyte tube 55 are reacted with each other through the solid electrolyte tube 55 made of β-alumina, thereby carrying out charging and discharging.

That is, charging and discharging are repeated with reversible reactions of $2Na+XS \rightarrow Na_2Sx$ (discharging) and $Na_2Sx \rightarrow 2Na+AS$ (charging). Here, sodium polysulfide ($Na_2Sx$) generated by the reaction is present in the above-described sulfur electrode 67. Therefore, in a discharged state, no sodium 65 is present in the inside of the solid electrolyte tube 55, and the solid electrolyte tube falls into a vacant state, and, in a charged state, the inside of the solid electrolyte tube 55 is filled with the sodium 65.

Hereinafter, an apparatus for recovering sodium from the NaS battery (hereinafter, referred to as the apparatus for recovering sodium) and a method for recovering sodium from the NaS battery (hereinafter, referred to as the method for recovering sodium) of the present invention will be described with reference to the accompanying drawings. Individual embodiments described below are the specific descriptions for better understanding the gist of the invention and, unless particularly otherwise described, do not limit the present invention. In addition, in the drawings used in the following descriptions, there are cases in which, for convenience, considered as main are illustrated in an enlarged manner in order to facilitate the understanding of the characteristics of the present invention, and the dimensional ratios and the like of individual constituents are not always the same as those of actual constituents.

(Apparatus for Recovering Sodium)

Figure 2:
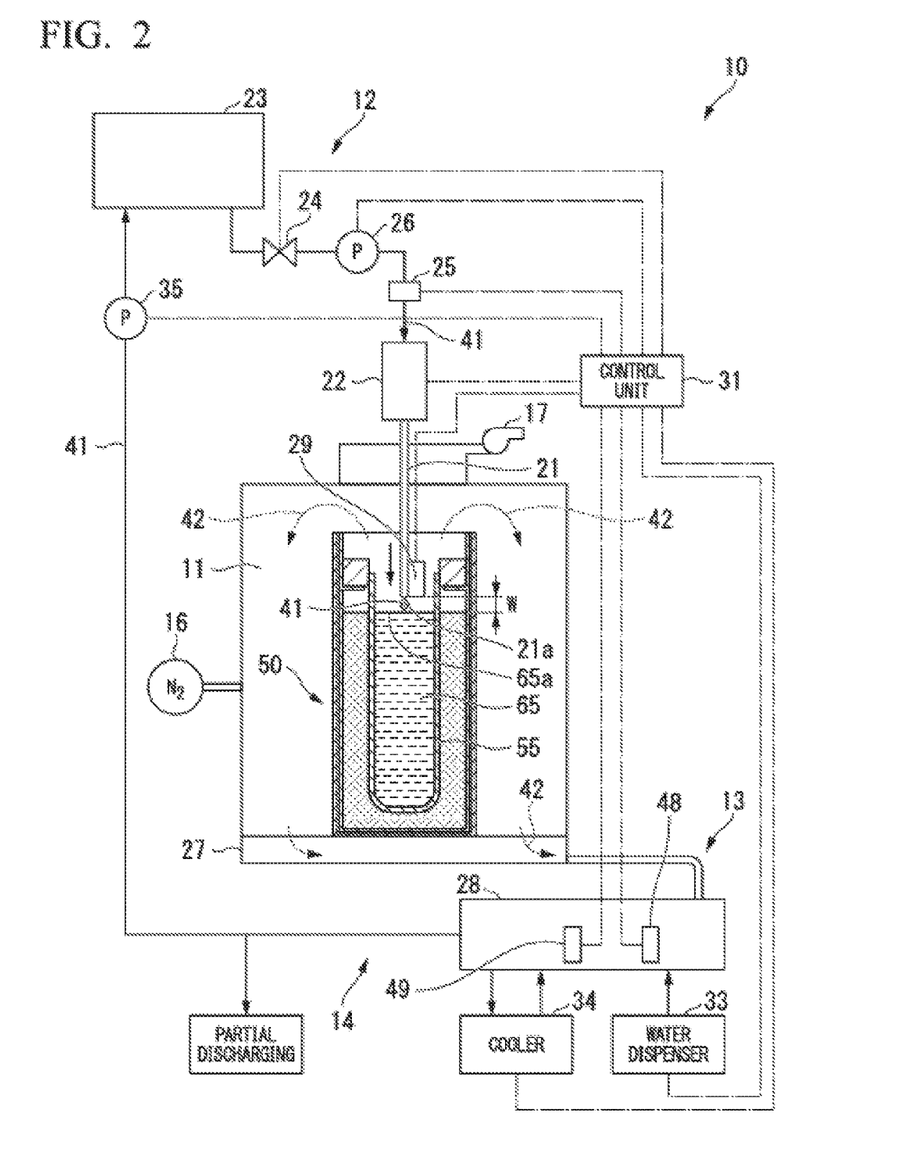
FIG. 2 is a configuration view illustrating an apparatus for recovering sodium from a NaS battery of the present invention.

FIG. 2 is a configuration view illustrating the apparatus for recovering sodium of the present invention.

An apparatus for recovering sodium 10 that will be described below is an apparatus for recovering sodium included in the NaS battery 50 in the form of a reaction liquid and, specifically, is an apparatus for recovering sodium in the form of an aqueous solution of sodium hydroxide.

The apparatus for recovering sodium 10 includes a chamber 11 housing the NaS battery 50, a treatment liquid supply 12, a reaction liquid-recovering 13, and a circulation treatment 14.

The chamber 11 is formed of, for example, a steel plate as a whole and has a space for housing the NaS battery 50 therein. An inert gas supply device 16 is connected to the chamber 11. The inert gas supply device 16 is made up of a nitrogen gas source supplying an inert gas, for example, nitrogen gas, a flow rate control valve, and the like. A space in the chamber 11, in which the NaS battery 50 is housed, is filled with an inert gas using the inert gas supply device 16. As the inert gas being supplied to the inside of the chamber 11, in addition to nitrogen gas, argon gas or the like can be used.

In addition, exhausting device 17 is formed in the chamber 11. The exhausting device 17 is disposed, for example, above the installation location of the NaS battery 50 in the chamber 11, and discharges flammable gas generated by a chemical reaction between the sodium 65 in the NaS battery 50 described below and the treatment liquid 41, for example, hydrogen gas outside the chamber 11. The exhausting device 17 is made up of, for example, a fan with an explosion protection specification and the like.

At the upper of the chamber 11, a nozzle 21 is formed. The nozzle 21 is inserted into the inside of the solid electrolyte tube (sodium-housing) 55 and injects a treatment liquid 41 from an injection 21a toward the sodium 65 during the treatment of the NaS battery 50. The above-described nozzle 21 is connected to the treatment liquid supply 12, and the treatment liquid 41 is supplied from the treatment liquid supply 12. The nozzle 21 is made of, for example, a stainless steel hollow tube having a diameter in a range of approximately 10 mm to 20 mm.

The above-described nozzle 21 is supported by nozzle-moving device 22. The nozzle-moving device 22 is made up of, for example, a hydraulic cylinder and the like and vertically moves the nozzle 21. The nozzle-moving device 22 is controlled using a control unit 31.

The treatment liquid supply 12 is for supplying the treatment liquid 41 to the nozzle 21 and is made up of a treatment liquid tank 23 storing the treatment liquid 41, a valve 24 for controlling the flow rate of the treatment liquid 41, a temperature sensor (first temperature detector) 25 for detecting the liquid temperature of the treatment liquid 41, a pump 26 for sending the treatment liquid 41, and several pipes.

As the treatment liquid tank 23, a tank having a capacity that is equal to or greater than the liquid amount of the treatment liquid 41 necessary for the treatment of at least one batch of the NaS batteries 50 is used. In addition, the treatment liquid tank 23 is installed at a location higher than the installation location of the chamber 11 so that the treatment liquid 41 can be made to naturally flow down toward the nozzle 21 without using the pump 26. The opening and closing degree of the valve 24 is controlled using the control unit 31. The liquid temperature data of the treatment liquid 41 detected using the temperature sensor (first temperature detector) 25 is input into the control unit 31.

The reaction liquid-recovering 13 recovers a reaction liquid 42 generated from a reaction between the treatment liquid 41 and the sodium 65 in the NaS battery 50. The reaction liquid-recovering 13 is made up of a sink 27 formed at the bottom of the chamber 11, a reaction liquid tank 28 for temporarily storing the reaction liquid 42 collected using the sink 27, a temperature sensor (second temperature detector) 29 disposed in the vicinity of the front end of the nozzle 21 in order to detect the liquid temperature of the reaction liquid 42, and several pipes. The reaction liquid tank 28 is installed at a location lower than the installation location of the chamber 11 so that the reaction liquid 42 from the sink 27 can be recovered through a natural downward flow. The liquid temperature data of the reaction liquid 42 detected using the temperature sensor (second temperature detector) 29 is input into the control unit 31.

The circulation treatment 14 is made up of water dispenser 33, cooler 34, a pump 35, and several pipes. The water dispenser 33 adds water to the reaction liquid 42 supplied from the reaction liquid tank 28 and mixes the water and the reaction liquid, and is made up of a mixer (not illustrated) for recycling the reaction liquid as a treatment liquid 41, a concentration sensor 48, a temperature sensor (third temperature detector) 49, and the like.

Specifically, the water dispenser 33 mixes water into an aqueous solution of NaOH having a second concentration, which is higher than a first concentration, obtained from a reaction between the treatment liquid 41 made of an aqueous solution of NaOH having the first concentration and the sodium 65 so as to reproduce an aqueous solution of NaOH having the first concentration. At this time, the concentration of the aqueous solution of NaOH is appropriately measured using the concentration sensor 48, and the amount of water to be added is controlled so that the aqueous solution of NaOH has the first concentration.

The cooler 34 is made up of, for example, a heat exchanger (not illustrated), the temperature sensor (third temperature detector) 49, and the like. The cooler 34 cools the treatment liquid 41 generated using the water dispenser 33 to a predetermined temperature. The treatment liquid 41 can be cooled by, for example, exchanging heat with water for diluting the reaction liquid 42 which is used in the water dispenser 33.

The pump 35 supplies the treatment liquid 41 adjusted to a predetermined temperature and concentration toward the treatment liquid tank 23 installed at a location higher than the chamber 11. The pump 35 is controlled using the control unit 31.

The control unit 31 controlling the operation of the entire apparatus for recovering sodium 10 is made up of, for example, a personal computer, an interface, input and output wires, and the like.

(Method for Recovering Sodium)

Next, the method for recovering sodium of the present invention using the apparatus for recovering sodium 10 having the above-described constitution will be described with reference to FIGS. 2 and 3.

Figure 3:
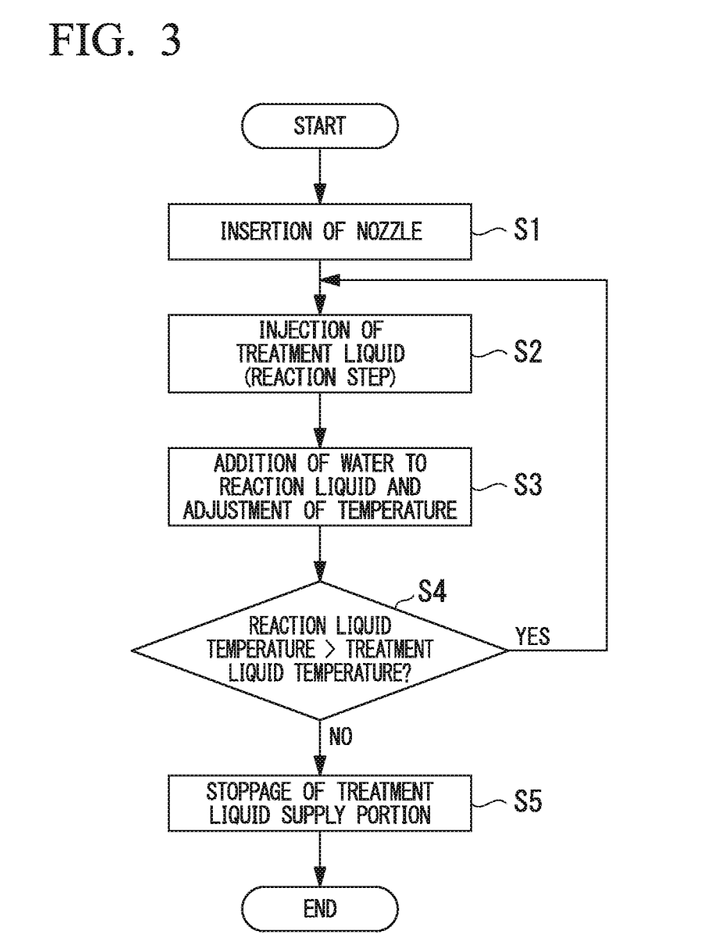
FIG. 3 is a flowchart illustrating a method for recovering sodium from the NaS battery of the present invention in a stepwise manner.

FIG. 3 is a flowchart illustrating the method for recovering sodium of the present invention in a stepwise manner.

When sodium is recovered from the NaS battery 50 that has been used for the entire service life using the apparatus for recovering sodium 10 of the present invention, first, a hole is formed in the electrode cap 59 as a pretreatment.

As the NaS battery 50 to be treated using the apparatus for recovering sodium 10 of the present invention, a battery that has been brought into a charged state in advance, that is, a state in which the sodium 65 is present inside the solid electrolyte tube (sodium-housing) 55, is used.

The diameter of the hole formed in the electrode cap 59 is greater than the diameter of the nozzle 21 in the apparatus for recovering sodium 10 and, for example, may be in a range of approximately 20 mm to 30 mm. A hole having the above-described small diameter can be easily formed using a pin or the like, a concern of the generation of spark during processing is small compared with cutting processing or the like, and it is possible to prevent the ignition of sodium.

Through this hole in the electrode cap 59, in a reaction step described below, the nozzle 21 is inserted, and the reaction liquid 42 that has reacted with the sodium 65 overflows and leaks out.

Next, the NaS battery 50 having the hole formed in the electrode cap 59 is housed in the chamber 11 of the apparatus for recovering sodium 10 of the present invention. The inside of the chamber 11 is already filled with, for example, nitrogen gas using the inert gas supply device 16. The inert gas supply device 16 preferably continuously supplies nitrogen gas, which is an inert gas, toward the chamber 11 at a predetermined flow rate while the NaS battery 50 is being treated.

Next, the nozzle 21 is inserted into the inside of the solid electrolyte tube 55 in the NaS battery 50 by operating the nozzle-moving device 22 (S1). In addition, the treatment liquid 41 is injected toward the sodium 65 from the treatment liquid tank 23 at a predetermined flow rate by operating the pump 26 in the treatment liquid supply 12, and the treatment liquid 41 and the sodium 65 are caused to react with each other (reaction step: S2).

As the treatment liquid 41, an aqueous solution of sodium hydroxide is used. An aqueous solution of sodium hydroxide reacts with the sodium 65 in a state where the reaction rate is suppressed more than that of water. For example, when water is injected toward sodium, a reaction violently proceeds; however, when sodium hydroxide is injected, the amount of NaOH newly generated from a reaction between water in the aqueous solution of sodium hydroxide and sodium is suppressed due to NaOH that is already included in the aqueous solution. Therefore, the highly reactive sodium 65 is reacted with water at a suppressed reaction rate, thereby generating NaOH.

The concentration of the aqueous solution of sodium hydroxide constituting the treatment liquid 41 is preferably set in a range of 30% by weight to 50% by weight. When the concentration of the aqueous solution of sodium hydroxide is lower than 30% by weight, the reaction rate with respect to the sodium 65 is too fast, and there is a concern that the sodium 65 may be melted due to the reaction heat, which is not preferable. On the other hand, when the concentration exceeds 50% by weight, the reaction rate with respect to the sodium 65 is significantly decreased, and there is a concern that the efficient treatment of the NaS battery 50 may be impossible. The concentration of the treatment liquid 41 can be adjusted using the water dispenser 33.

The temperature of the aqueous solution of sodium hydroxide constituting the treatment liquid 41 is preferably set in a range of 15° C. to 55° C. The reaction rate between the aqueous solution of sodium hydroxide and the sodium varies depending on the liquid temperature of the aqueous solution of sodium hydroxide. When the temperature of the aqueous solution of sodium hydroxide is lower than 15° C., the reaction rate with respect to the sodium 65 is significantly decreased, and there is a concern that the efficient treatment of the NaS battery 50 may be impossible. On the other hand, when the temperature of the aqueous solution of sodium hydroxide exceeds 55° C., the sodium 65 separates, turns into sodium lumps, and flows out to the chamber 11, which is not preferable. The temperature of the treatment liquid 41 can be adjusted using the cooler 34.

Figure 6:
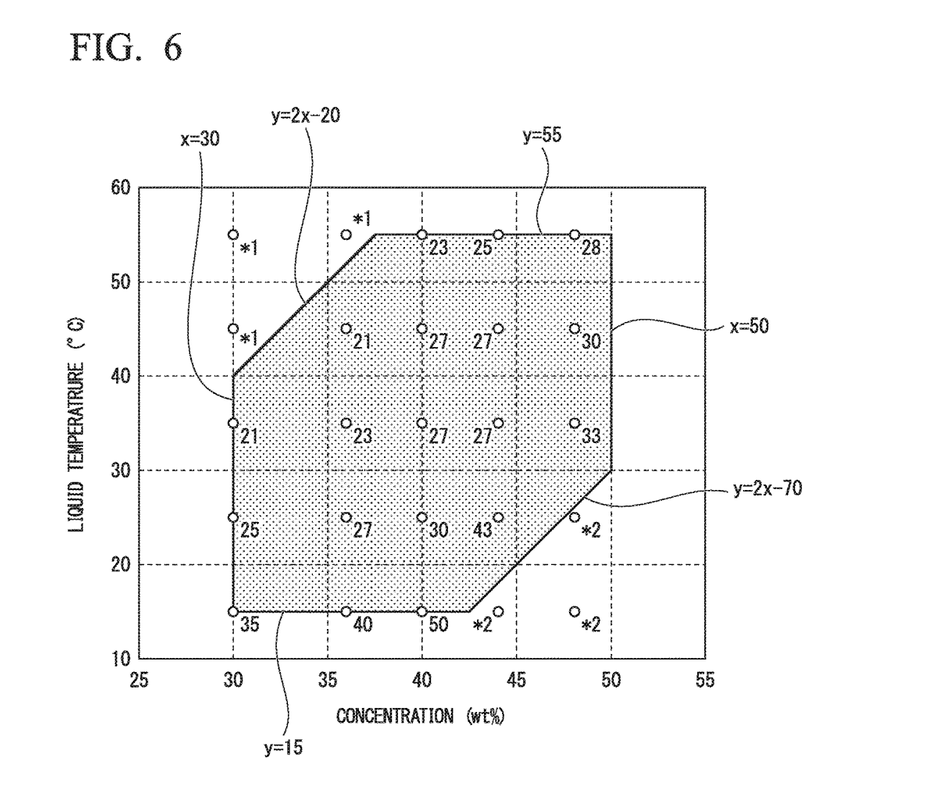
FIG. 6 is a graph illustrating a validation example of the present invention.

When the treatment liquid 41 and the sodium 65 are reacted with each other, in a case in which the concentration of the treatment liquid 41 is low, it is necessary to decrease the liquid temperature in order to control the reaction, and, in a case in which the liquid temperature is high, it is necessary to increase the concentration of the treatment liquid 41 in order to control the reaction. That is, in order to control the treatment liquid 41 and the sodium 65 to be safely and efficiently reacted together, it is necessary to hold the concentration and liquid temperature of the treatment liquid 41 in, basically, a positive correlation. In the present embodiment, when the concentration (wt %) of the treatment liquid 41 is represented by x and the liquid temperature (° C.) is represented by y, the concentration and liquid temperature are set so as to fall into a range surrounded by the following linear expressions, x=30, x=50, y=15, y=55, y=2x−20, and y=2x−70. A graph illustrating the above-described range of the concentration and the liquid temperature is illustrated in FIG. 6. The optimal combined range of the concentration and the liquid temperature will be described in a validation example described below.

Through the reaction step S2, the aqueous solution of sodium hydroxide constituting the treatment liquid 41 reacts with the sodium 65 and thus generates sodium hydroxide, and a reaction liquid 42 having a higher concentration than the aqueous solution of sodium hydroxide of the treatment liquid 41 is generated. The above-described reaction liquid 42 has a concentration of sodium hydroxide that is approximately 1% to 5% higher than that of the treatment liquid 41. In addition, the sodium 65 present inside the solid electrolyte tube 55 is recovered in the form of sodium hydroxide and gradually diminishes.

The nozzle-moving device 22 gradually lowers the location of the nozzle 21 toward the bottom of the solid electrolyte tube 55 in accordance with the sodium 65 in the solid electrolyte tube 55 diminishing as the reaction proceeds. Therefore, the interval W between the injection 21a of the nozzle 21 and an exposed surface 65a of the sodium 65 is maintained at a distance in a predetermined range while the treatment liquid 41 and the sodium 65 react with each other.

In the step in which the treatment liquid 41 and the sodium 65 react with each other and thus the reaction liquid 42 is generated, the liquid temperature in the vicinity of the exposed surface 65a of the sodium 65 becomes a high temperature due to an exothermic reaction; however, when the nozzle 21 is lowered in accordance with the sodium 65 diminishing as the reaction proceeds so as to maintain the interval W at a predetermine distance, the treatment liquid 41 at a predetermined temperature continuously flows in the vicinity of the exposed surface 65a of the sodium 65. Therefore, an abrupt reaction progress of the sodium 65 is prevented, and thus it is possible to stably remove the sodium 65 in the form of sodium hydroxide at a predetermined reaction rate.

The nozzle 21 may be lowered using the nozzle-moving device 22 in accordance with the phase of the exposed surface 65a lowering on the basis of the previously-estimated reaction rate of the sodium 65. In addition, it is also possible to control the lowering of the nozzle 21 on the basis of location information obtained by providing a laser distance measurement or the like in the upper of the chamber 11 and continuously measuring the location of the exposed surface 65a of the sodium 65.

In addition, the nozzle 21 may be lowered using the nozzle-moving device 22 in a stepwise (intermittently) or continuous manner.

In addition, in the step of causing the treatment liquid 41 and the sodium 65 to react with each other so as to generate the reaction liquid 42, although hydrogen gas is generated, this hydrogen gas is rapidly exhausted from the inside of the chamber 11 using the exhausting device 17. In addition, since the inside of the chamber 11 is filled with an inert gas, for example, nitrogen gas, using the inert gas supply device 16, it is possible to stably exhaust hydrogen gas generated in the reaction step without allowing the hydrogen gas to react with oxygen gas or the like.

The reaction liquid 42 generated from the reaction between the treatment liquid 41 and the sodium 65 overflows from the exterior container (battery container) 51 in the NaS battery 50 and is received in the sink 27 in the bottom of the chamber 11 constituting the reaction liquid-recovering 13. In addition, the reaction liquid flows from the sink 27 to the reaction liquid tank 28. The reaction liquid 42 is temporarily stored in the reaction liquid tank 28.

The reaction liquid 42 in the reaction liquid tank 28 is treated using the circulation treatment 14 and is returned to the treatment liquid tank 23 in the form of the treatment liquid 41. The reaction liquid 42 supplied from the reaction liquid tank 28 is, first, mixed with water added using the water dispenser 33. Therefore, the concentration of the reaction liquid 42 is diluted. Specifically, the aqueous solution of NaOH (reaction liquid 42) having the second concentration, which is higher than the first concentration, obtained from the reaction between the treatment liquid 41 made of the aqueous solution of NaOH having the first concentration and the sodium 65 is mixed with water, and is thus returned to an aqueous solution of NaOH (treatment liquid 41) having the first concentration. At this time, the concentration of the aqueous solution of NaOH is appropriately measured using the concentration sensor 48, and the amount of water to be added is controlled so that the aqueous solution of NaOH has the first concentration.

The concentration of the aqueous solution of sodium hydroxide, which is the treatment liquid 41 generated (reproduced) using the water dispenser 33, is adjusted in a range of 30% by weight to 48% by weight. In the present embodiment, the reaction liquid is diluted so as to produce an aqueous solution of sodium hydroxide having a concentration of 36% by weight as the treatment liquid 41.

In the water dispenser 33, it is preferable to form a flow path for exhausting some of the generated (reproduced) treatment liquid 41 without returning the above-described treatment liquid to the reaction liquid tank 28. Since the total amount of the treatment liquid 41 generated (reproduced) by the dilution of the reaction liquid 42 generated from the reaction between the treatment liquid 41 and the sodium 65 continuously increases, the total amount of the treatment liquid 41 being circulated in the apparatus for recovering sodium 10 can be maintained at a constant level by exhausting some of the treatment liquid.

The treatment liquid 41 generated (reproduced) using the water dispenser 33 is cooled using the cooler 34 so as to reach a predetermined temperature, for example, a temperature in a range of 30° C. to 60° C. Since the treatment liquid 41 generated using the water dispenser 33 often reaches a high temperature due to the reaction heat in the reaction step, the treatment liquid 41 is cooled by exchanging heat with water for dilution used in the water dispenser 33. In the present embodiment, the treatment liquid 41 is cooled so that the liquid temperature reaches 35° C.

Through the above-described processes, the reaction liquid 42 is recycled as the treatment liquid 41 having a concentration of 36% by weight and a liquid temperature of 35° C. using the water dispenser 33 and the cooler 34 constituting the circulation treatment 14 (circulation step: S3). After that, the treatment liquid 41 generated in the circulation treatment 14 is supplied toward the treatment liquid tank 23 using the pump 35.

Although it is difficult to observe the amount of the sodium 65 remaining in the solid electrolyte tube 55, which is continuously decreasing in the reaction step S2, from outside, it is possible to detect the end point at which all the sodium 65 is reacted by comparing the liquid temperatures of the treatment liquid 41 and the reaction liquid 42 (S4).

That is, during the treatment of the NaS battery 50, the control unit 31 compares the liquid temperature of the treatment liquid 41 being supplied toward the NaS battery 50, which is measured using the temperature sensor (first temperature detector) 25 in the treatment liquid supply 12, and the liquid temperature of the reaction liquid 42 after the reaction with the sodium 65, which is measured using the temperature sensor (second temperature detector) 29 in the reaction liquid-recovering 13. In addition, a point in time when the liquid temperatures of the treatment liquid 41 and the reaction liquid 42 become almost equal to each other is determined as the end point at which all the sodium 65 has reacted with the treatment liquid 41 and thus disappears, and the valve 24 controlling the flow rate of the treatment liquid 41 is closed so as to stop the supply of the treatment liquid 41. As described above, a case in which the remaining amount of the sodium 65 reaches zero can be reliably and easily detected using the fact that, while the treatment liquid 41 reacts with the sodium 65, the liquid temperature of the reaction liquid 42 is higher than the liquid temperature of the treatment liquid 41 due to the reaction heat.

When the sodium 65 present inside the solid electrolyte tube 55 in the NaS battery 50 reacts with the treatment liquid 41 so as to turn into sodium hydroxide, and the sodium hydroxide is recovered in the form of the reaction liquid 42 through the above-described steps, the treatment of the sodium 65 in the NaS battery 50 is completed (S5).

In the above-described reaction step, in a case in which the temperature of the reaction liquid 42 measured using the temperature sensor (third temperature detector) 49 is higher than a previously-set value, the control unit 31 determines the reaction as an abnormal reaction between the treatment liquid 41 and the sodium 65. In addition, it is also preferable to provide, for example, a reverse mechanism (not illustrated) or the like for reversing or the like the NaS battery 50 under the treatment so as to rapidly exhaust the treatment liquid 41 in the NaS battery 50 and thus stop the reaction of the sodium 65.

In addition, in a case in which power supplied to the apparatus for recovering sodium 10 is blocked due to power outage or the like, an abnormal increase in the liquid temperature of the reaction liquid 42 is prevented by supplying the treatment liquid 41 through a natural downward flow. That is, since the treatment liquid tank 23 is installed at a location higher than the installation location of the chamber 11, it is possible to cause the treatment liquid 41 to naturally flow down toward the nozzle 21 without driving the pump 26 due to power outage. In addition, the treatment liquid tank 23 has a capacity that is equal to or greater than the liquid amount of the treatment liquid 41 necessary for the disposal treatment of at least one batch of the NaS batteries 50. Therefore, it becomes possible to safely recover the sodium 65 in at least one batch of the NaS batteries 50 in the form of sodium hydroxide even when no power is supplied to the apparatus for recovering sodium 10.

As described above, according to the apparatus for recovering sodium of the present invention or the method for recovering sodium of the present invention using the same apparatus, when sodium is recovered from the NaS battery 50 that has been used for the entire service life, it becomes possible to suppress an increase in the temperature of the sodium 65 due to the reaction heat and to safely and efficiently recover the sodium 65 by using the treatment liquid 41, for example, an aqueous solution of sodium hydroxide, continuously injecting the treatment liquid from the nozzle 21 toward the sodium 65 so as to cause the treatment liquid and the sodium to react with each other, and recovering the sodium.

The NaS battery from which sodium has been recovered through the above-described steps is treated using, for example, a continuous copper-making facility.

Figure 4:
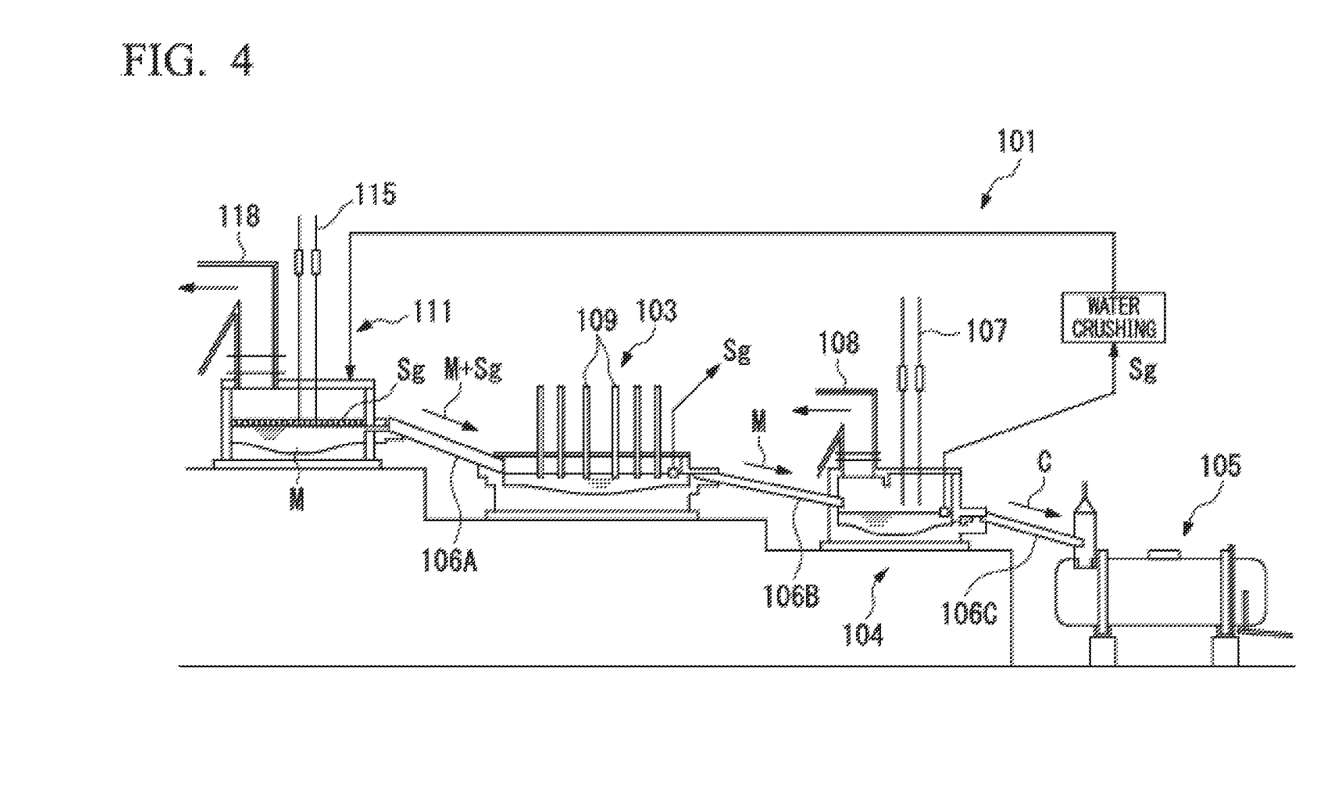
FIG. 4 is a configuration view illustrating a continuous copper-making facility used for the treatment of the NaS battery after the recovery of sodium.

FIG. 4 is a configuration view illustrating an example of the continuous copper-making facility.

A continuous copper-making facility 101 has a smelting furnace 111 for generating a molten body having matte M and slag Sg by heating and melting copper concentration, which is a raw material, a separation furnace 103 for separating the matte M and the slag Sg generated in the smelting furnace 111, a copper-making furnace 104 for generating coarse copper C and slag Sg by further oxidizing the matte M separated in the separation furnace 103, and a purification furnace 105 for generating higher-quality copper by purifying the coarse copper C generated in the copper-making furnace 104. The smelting furnace 111, the separation furnace 103, the copper-making furnace 104, and the purification furnace 105 are coupled to each other through tubes 106A, 106B, and 106C, and are vertically provided in this order so that the molten body is sequentially moved through the smelting furnace 111, the separation furnace 103, the copper-making furnace 104, and the purification furnace 105 by the exertion of gravity.

In the smelting furnace 111 and the copper-making furnace 104, lances 115 and 107, which are made up of a plurality of tubes for supplying copper concentrate, oxygen-enriched air, a solvent, a cooling agent, and the like into the furnaces, are provided so as to be capable of vertically moving through the roofs of the furnaces, and exhausting openings for exhausting gas generated from the inside of the furnaces are provided in the roof of the furnaces. Boilers 118 and 108 are connected to the exhausting openings.

The separation furnace 103 is a furnace for separating the matte M and the slag Sg in the molten body sent from the smelting furnace 111 using the difference in specific gravity, and a layer of the slag Sg having a small specific gravity is formed on a layer of the matte M having a large specific gravity. Into the separation furnace 103, a plurality of electrodes 109 is inserted in a state in which the lower ends thereof are immersed in the slag. In the separation furnace 103, the temperature of the molten body is maintained by inputting a three-phase alternating current into the electrodes 109 from a transformer so as to generate Joule heat.

In order to refine copper in the continuous copper-making facility 101, dried copper concentrate and a flux (silica sand, lime, or the like) are blown into the molten body in the smelting furnace 111 using the lance 115 together with oxygen-enriched air. In the smelting furnace 111, the melting and oxidation reaction of the raw material proceed, the matte M made of a mixture containing copper sulfide and iron sulfide as main components and the slag Sg made up of veinstone in the copper concentration, the solvent, iron oxide, and the like are generated. The matte M and the slag Sg are sent to the separation furnace 103 through the tube 106A, and are separated into a lower layer of the matte M and an upper layer of the slag Sg using the difference in specific gravity in the separation furnace.

The slag Sg separated in the separation furnace 103 is recovered using existing slag-recovering device. In addition, sulfur-containing gas such as $SO_2$ gas generated in the smelting furnace 111 and the like is sent to a sulfuric acid plant and is recovered in the form of sulfuric acid or calcium sulfate ($CaSO_4$).

The matte M separated in the separation furnace 103 is sent to the copper-making furnace 104 through the tube 106B. In the copper-making furnace 104, a flux is blown in together with air so as to oxidize sulfur and an iron component in the matte M, and coarse copper C having a purity of 98.5% or higher is obtained. The coarse copper C continuously generated in the copper-making furnace 104 is injected into the purification furnace 105 through the tube 106C and is made into a copper raw material.

Figure 5:
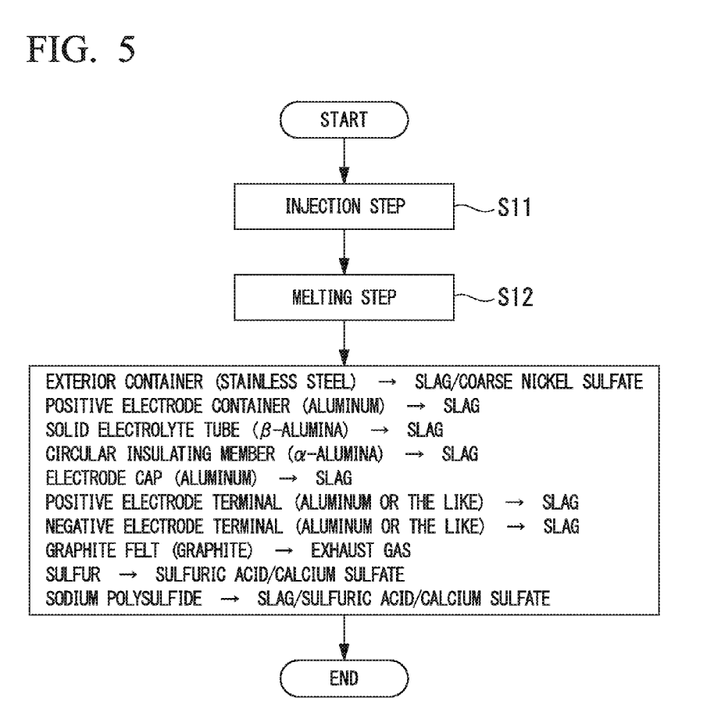
FIG. 5 is a flowchart illustrating a treatment example of the NaS battery after the recovery of sodium.

FIG. 5 is a flowchart illustrating a treatment step of the NaS battery after the recovering of sodium in which the continuous copper-making facility is used.

The NaS battery 50 from which sodium has been recovered is injected into the smelting furnace 111 (injection step S11). The NaS battery 50 injected into the smelting furnace 111 is immersed in the molten body having a high temperature, for example, in a range of 1220° C. to 1240° C. and is melted (melting step S12). Therefore, the exterior container 51, the positive electrode container 53, and the solid electrolyte tube 55 of the NaS battery 50 are melted, and sulfur (S) loaded in the NaS battery also flows out into the smelting furnace 111.

Here, the sulfur (S) flowing out into the smelting furnace 111 is oxidized due to oxygen in the smelting furnace 111 and thus turns into $SO_2$ gas and the like, is recovered through an uptake (not illustrated) or the boiler 118 together with sulfur-containing gas generated from copper sulfide, iron sulfide, or the like, and is sent to a sulfuric acid plant not illustrated.

Furthermore, sodium polysulfide ($Na_2Sx$) present in the sulfur electrode 67 (refer to FIG. 1) is separated into a sodium component and a sulfur component, the sodium component is absorbed into the slag Sg, and the sulfur component turns into $SO_2$ gas or the like and is recovered.

In addition, regarding the exterior container 51 (refer to FIG. 1) made of stainless steel, a nickel component is recovered in the form of coarse nickel sulfate, and other components are oxidized and absorbed into the slag Sg.

The positive electrode container 53 the electrode cap 59, the positive electrode terminal 61 and the negative electrode terminal 62 which are made of aluminum are also oxidized and absorbed into the slag Sg.

The solid electrolyte tube 55 and the circular insulating member 57 which are made of alumina are absorbed into the slag Sg as they are.

Furthermore, the graphite felt constituting the sulfur electrode 67 is combusted in the smelting furnace 111 and is exhausted through the uptake (not illustrated) and the boiler 118 as exhaust gas.

The slag Sg generated in the smelting furnace 111 is transferred to the separation furnace 103 through a molten body-exhausting opening (not illustrated) together with the matte M. In addition, as described above, the slag Sg is separated from the matte M in the separation furnace 103 and is recovered. The slag Sg is quenched and solidified by dropping molten slag Sg into a water stream, whereby water-crushed slag having a grain diameter of approximately 2 mm is produced. The water-crushed slag is reused as a cement raw material, a sand blast material, a concrete fine aggregate, or the like.

In addition, the sulfur component, which is sent to a sulfur plant in the form of $SO_2$ gas, is recovered as sulfuric acid and calcium sulfate.

In the above-described manner, all members constituting the NaS battery can be treated.

The aqueous solution of sodium hydroxide obtained using the method for recovering sodium of the present invention can be used as a neutralizing agent with respect to an acid liquid generated in a copper-refining place.

Thus far, the embodiment of the present invention has been described, but the present invention is not limited thereto, and can be appropriately modified within the scope of the technical concept of the present invention.

In the present embodiment, the apparatus for recovering sodium 10 for treating a single NaS battery 50 has been exemplified; however, additionally, it is also preferable to provide a constitution in which, for example, a chamber capable of housing a plurality of NaS batteries is provided, a plurality of nozzles is arranged, and sodium from the plurality of NaS batteries is collectively reacted and recovered.

In addition, in the present embodiment, the aqueous solution of sodium hydroxide has been exemplified as the treatment liquid 41; however, additionally, it is also possible to use a liquid other than the aqueous solution of sodium hydroxide as long as the liquid has a more suppressed reaction rate with sodium than that of water. Examples of the above-described treatment liquid include an aqueous solution of potassium hydroxide and the like.

In addition, in the present embodiment, a treatment example in which the continuous copper-making facility is used has been described as the method for treating the NaS battery from which sodium has been recovered, but the present invention is not limited thereto. Although the case in which the NaS battery from which sodium has been recovered is treated using the smelting furnace in the continuous copper-making facility has been described, a smelting furnace in other copper-refining furnace facility, for example, a smelting furnace in a flash smelter facility may be used. It is possible to employ a variety of treatment methods such as a method in which a NaS battery from which sodium has been recovered is disassembled into individual constituent members and then is recovered.

Examples

Hereinafter, the validation results obtained by validating the ranges of the optimal combination of the concentration and liquid temperature of aqueous solutions of sodium hydroxide which are the treatment liquids used in the present invention will be shown. In the validation, aqueous solutions of sodium hydroxide respectively having concentrations of 30, 36, 40, 44, and 48 (% by weight) were prepared, the aqueous solutions of sodium hydroxide having the respective concentration were adjusted so that the liquid temperatures reached 15, 25, 35, 45, and 55 ($°$ C.), and the time taken for all the sodium in each NaS battery (having a sodium capacity of 800 g) to be reacted was measured.

The measurement results are illustrated in FIG. 6. In the graph illustrated in FIG. 6, measurement points are indicated using white circles, and numeric values shown in the vicinities of the respective measurement points indicate the time (minutes) necessary for all the sodium to be reacted. In addition, the measurement point marked with *1 indicates a state in which the treatment liquid and sodium are excessively reacted with each other, unreacted sodium was separated out in a lump shape, and the outflow of the sodium into the chamber was observed. The measurement point marked with *2 indicates a state in which sodium was not fully reacted even after one hour elapsed from the initiation of the reaction and thus some of the sodium remained. The states marked with *1 and *2 are both outside the range of the optimal conditions.

According to the results illustrated in FIG. 6, when the treatment liquid 41 and the sodium 65 react with each other, if the concentration and liquid temperature of the treatment liquid are set so as to fall into a range surrounded by the following linear expressions, $x=30$, $x=50$, $y=15$, $y=55$, $y=2x-20$, and $y=2x-70$, in which the concentration (wt %) is represented by x and the liquid temperature ($°$ C.) is represented by y, it is possible to reliably recover all the sodium in the form of sodium hydroxide by preventing a disadvantage in which the reaction rate of the treatment liquid with sodium becomes excessively fast, the temperature of the sodium is excessively increased due to the reaction heat, and unreacted sodium was separated out in a lump shape and flows out to the chamber. In addition, it is possible to efficiently recover sodium within a short period of time by preventing a case in which the reaction rate of the treatment liquid and sodium become excessively slow, and thus the time necessary to recover sodium from a NaS battery exceeds one hour, which makes an efficient treatment impossible.

INDUSTRIAL APPLICABILITY

According to the aspect of the method for recovering sodium from a sodium-sulfur battery of the present invention and the aspect of the apparatus for recovering sodium from a sodium-sulfur battery to which this method is applied, it becomes possible to efficiently and safely treat disposed NaS batteries.

Therefore, the present invention is industrially applicable.

REFERENCE SIGNS LIST

10 APPARATUS FOR RECOVERING SODIUM (APPARATUS FOR RECOVERING SODIUM FROM NaS BATTERY)
11 CHAMBER
12 TREATMENT LIQUID SUPPLY
13 REACTION LIQUID-RECOVERING
14 CIRCULATION TREATMENT
21 NOZZLE
22 NOZZLE-MOVING DEVICE
23 TREATMENT LIQUID TANK
31 CONTROL UNIT
33 WATER DISPENSER
34 COOLER
41 TREATMENT LIQUID
42 REACTION LIQUID
50 NaS BATTERY
55 SOLID ELECTROLYTE TUBE (SODIUM-HOUSING)
65 SODIUM

The invention claimed is:

1. A method for recovering sodium from a sodium-sulfur battery housing sodium and sulfur in a battery container, the method comprising:
   a nozzle insertion step of inserting a nozzle to which a treatment liquid is supplied from a treatment liquid supply into the battery container;
   a reaction step of injecting a treatment liquid from the nozzle toward the sodium housed in a sodium-housing in the battery container, and causing the sodium to react with the treatment liquid so as to generate a reaction liquid; and
   a circulation step of collecting the reaction liquid, adjusting the concentration and liquid temperature of the collected reaction liquid so as to generate the treatment liquid, and returning the generated treatment liquid to the treatment liquid supply; wherein
   in the reaction step, while the entire amount of the sodium is reacted with the treatment liquid, the treatment liquid is continuously injected toward the sodium.

2. The method for recovering sodium from a sodium-sulfur battery according to claim 1, wherein
   the treatment liquid is an aqueous solution of sodium hydroxide.

3. The method for recovering sodium from a sodium-sulfur battery according to claim 2, wherein
   when the concentration (wt %) is represented by x and the liquid temperature ($°$ C.) is represented by y, the concentration and liquid temperature of the treatment liquid is set so as to fall into a range surrounded by the following linear expressions, $x=30$, $x=50$, $y=15$, $y=55$, $y=2x-20$, and $y=2x-70$.

4. An apparatus for recovering sodium from a sodium-sulfur battery used in the method for recovering sodium from a sodium-sulfur battery according to claim 1, the apparatus comprising:
   a nozzle configured to inject the treatment liquid toward the sodium in the sodium-housing while being in a state where the nozzle is inserted to the sodium-housing;
   a treatment liquid supply configured to supply the treatment liquid to the nozzle;

a reaction liquid-recoverer configured to recover the reaction liquid obtained from a reaction between the treatment liquid and the sodium; and a circulation treatment configured to return the reaction liquid to the treatment liquid supply as the treatment liquid after adjusting the concentration and liquid temperature of the reaction liquid.

5. The apparatus for recovering sodium from a sodium-sulfur battery according to claim 4, the apparatus further comprising a nozzle-moving device configured to vertically move the nozzle so as to maintain a certain range of a gap between an exposed surface of the sodium and an injection of the nozzle.

6. The apparatus for recovering sodium from a sodium-sulfur battery according to claim 4, wherein the circulation treatment is provided with a water dispenser for decreasing the concentration of the reaction liquid and a cooler for decreasing the temperature of the reaction liquid.

7. The apparatus for recovering sodium from a sodium-sulfur battery according to claim 4, the apparatus further comprising:

a first temperature detector configured to measure the liquid temperature of the treatment liquid;

a second temperature detector configured to measure the liquid temperature of the reaction liquid; and a control configured to control the treatment liquid supply after comparing the liquid temperature of the treatment liquid and the liquid temperature of the reaction liquid and determining the occurrence of a reaction of the sodium in the sodium-housing.

8. The apparatus for recovering sodium from a sodium-sulfur battery according to claim 4, the apparatus further comprising:

a chamber configured to house the sodium-sulfur battery;

an inert gas supply configured to supply an inert gas into the chamber; and an exhausting device configured to exhaust flammable gas from the chamber.

9. A method for recovering sodium from a sodium-sulfur battery housing sodium and sulfur in a battery container, the method comprising:

a reaction step of injecting a treatment liquid toward the sodium housed in a sodium-housing in the battery container, and causing the sodium to react with the treatment liquid so as to generate a reaction liquid; and a circulation step of adjusting the concentration and liquid temperature of the reaction liquid so as to generate the treatment liquid;

wherein, in the reaction step, while the entire amount of the sodium is reacted with the treatment liquid, the treatment liquid is continuously injected toward the sodium, and the reaction of the sodium is determined to have ceased when the liquid temperature of the treatment liquid and the liquid temperature of the reaction liquid become equal to each other, and the supply of the treatment liquid is stopped.

10. The method for recovering sodium from a sodium-sulfur battery according to claim 9, wherein the treatment liquid is an aqueous solution of sodium hydroxide.

11. The method for recovering sodium from a sodium-sulfur battery according to claim 10, wherein when the concentration (wt %) is represented by x and the liquid temperature (° C.) is represented by y, the concentration and liquid temperature of the treatment liquid is set so as to fall into a range surrounded by the following linear expressions, $x=30$, $x=50$, $y=15$, $y=55$, $y=2x-20$, and $y=2x-70$.

12. An apparatus for recovering sodium from a sodium-sulfur battery used in the method for recovering sodium from a sodium-sulfur battery according to claim 9, the apparatus comprising:

a nozzle configured to inject the treatment liquid toward the sodium in the sodium-housing while being in a state where the nozzle is inserted to the sodium-housing;

a treatment liquid supply configured to supply the treatment liquid to the nozzle;

a reaction liquid-recoverer configured to recover the reaction liquid obtained from a reaction between the treatment liquid and the sodium; and a circulation treatment configured to return the reaction liquid to the treatment liquid supply as the treatment liquid after adjusting the concentration and liquid temperature of the reaction liquid.

13. The apparatus for recovering sodium from a sodium-sulfur battery according to claim 12, the apparatus further comprising a nozzle-moving device configured to vertically move the nozzle so as to maintain a certain range of a gap between an exposed surface of the sodium and an injection of the nozzle.

14. The apparatus for recovering sodium from a sodium-sulfur battery according to claim 12, wherein the circulation treatment is provided with a water dispenser for decreasing the concentration of the reaction liquid and a cooler for decreasing the temperature of the reaction liquid.

15. The apparatus for recovering sodium from a sodium-sulfur battery according to claim 12, the apparatus further comprising:

a first temperature detector configured to measure the liquid temperature of the treatment liquid;

a second temperature detector configured to measure the liquid temperature of the reaction liquid; and a control configured to control the treatment liquid supply after comparing the liquid temperature of the treatment liquid and the liquid temperature of the reaction liquid and determining the occurrence of a reaction of the sodium in the sodium-housing.

16. The apparatus for recovering sodium from a sodium-sulfur battery according to claim 12, the apparatus further comprising:

a chamber configured to house the sodium-sulfur battery;

an inert gas supply configured to supply an inert gas into the chamber; and an exhausting device configured to exhaust flammable gas from the chamber.

* * * * *